United States Patent
Rao et al.

(10) Patent No.: US 9,002,131 B2
(45) Date of Patent: Apr. 7, 2015

(54) METHOD AND SYSTEM FOR ENHANCING IMAGE QUALITY

(75) Inventors: Shyam Vasudeva Rao, Bangalore (IN); Chandrasekhar Kuppuswamy, Bangalore (IN); Mahabaleswara Ram Bhatt, Bangalore (IN); Sriram Padmanabhan, Bangalore (IN)

(73) Assignee: Forus Health Pvt. Ltd., Bangalore, Karnataka (IN)

( * ) Notice: Subject to any disclaimer, the term of this patent is extended or adjusted under 35 U.S.C. 154(b) by 0 days.

(21) Appl. No.: 14/131,979

(22) PCT Filed: Sep. 11, 2012

(86) PCT No.: PCT/IB2012/054713
§ 371 (c)(1),
(2), (4) Date: Jan. 10, 2014

(87) PCT Pub. No.: WO2013/038333
PCT Pub. Date: Mar. 21, 2013

(65) Prior Publication Data
US 2014/0193093 A1    Jul. 10, 2014

(30) Foreign Application Priority Data

Sep. 18, 2011 (IN) .......................... 2830/CHE/2011
Sep. 10, 2012 (IN) .......................... 3740/CHE/2012

(51) Int. Cl.
*G06K 9/40* (2006.01)
*G06T 5/00* (2006.01)
*G06T 5/20* (2006.01)

(52) U.S. Cl.
CPC .............. *G06T 5/002* (2013.01); *G06T 5/008* (2013.01); *G06T 5/20* (2013.01); *G06T 2207/20012* (2013.01); *G06T 2207/20032* (2013.01); *G06T 2207/20192* (2013.01); *G06T 5/003* (2013.01)

(58) Field of Classification Search
USPC ......... 382/261, 254, 260, 266, 264, 219, 275, 382/243, 240, 218; 358/3.26, 3.27; 348/51; 375/240.27, 240.08
See application file for complete search history.

(56) References Cited

U.S. PATENT DOCUMENTS 6,847,737 B1 * 1/2005 Kouri et al. ................... 382/260
6,937,775 B2 * 8/2005 Gindele et al. ................ 382/254

(Continued)

FOREIGN PATENT DOCUMENTS

WO    WO-2004/023787 A2    3/2004

OTHER PUBLICATIONS

Wang Chang-You et al: "A new kind of adaptive weighted median filter algorithm," Consumer Application and System Modeling (ICCASM), 2010 International Conference on, IEEE, Piscataway, NJ, USA, Oct. 22, 2010), pp. V11-667, XP031791273, ISBN: 978-1-4244-7235-2; Title; abstract; Equation 12.

(Continued)

*Primary Examiner* — Anh Do
(74) *Attorney, Agent, or Firm* — Harness, Dickey & Pierce, PLC

(57) ABSTRACT

The present disclosure relates to image filtering techniques for enhancing image quality. In one embodiment, two filtering techniques are applied on an image. Firstly, an adaptive weighted median filtering operation is performed on an acquired low contrast image corrupted by impulsive noise. Subsequently, a guided image filtering on the image obtained from adaptive weighted median filtering operation to de-blur and enhance the contrast that ultimately assures to preserve the edges of the images. In addition, the image filtering for enhancing image quality is enhanced by several variations of data adaptive guided image filtering and adaptive window sizes for guided image filtering techniques.

12 Claims, 7 Drawing Sheets

(56) References Cited

U.S. PATENT DOCUMENTS 7,133,568 B2 * 11/2006 Nikitin et al. ............... 382/260
7,515,763 B1 * 4/2009 Zhong ........................ 382/254

OTHER PUBLICATIONS

Zhang Buyue et al: "Adaptive Bilateral Filter for Sharpness Enhancement and Noise Removal," IEEE Transactions on Image Processing, IEEE Service Center, Piscataway, NJ, USA, vol. 15, No. 5, May 1, 2008, pp. 664-678, XP011225845, ISSN: 1057-7149, DOI: 10.1109/TIP.2008.919949 p. 666, equation 4; abstract; p. 667, line 5-line 9; p. 667, equation 6.

Nallaperumal Krishnan et al: "An efficient Switching Median Filter for Salt & Pepper Impulse Noise Reduction," Digital Information Management, 2006 1st International Conference on, IEEE, PI, Apr. 1, 2007, pp. 161-166, XP031095977, ISBN: 978-1-4244-0682-1; p. 162, right-hand column, last paragraph.

Pham Cuong Cao et al: "Adaptive Guided Image Filtering for Sharpness Enhancement and Noise Reduction," Jan. 1, 2012, Advances in Image and Video Technology, Springer Berlin Heidelberg, Berlin, Heidelberg, pp. 323-334, XP019170143, ISBN: 978-3-642-25366-9; the whole document.

He Kaiming et al: "Guided Image Filtering," Sep. 5, 2010, Computer Vision Ã ECCV2010, Springer Berlin Heidelberg, Berlin, Heidelberg, pp. 114, XP019150502, ISBN: 978-3-642-15548-2; the whole document.

International Search Report and Written Opinion of the International Searching Authority for PCT/IB2012/054713, mailed Mar. 11, 2013; ISA/EP.

Written Opinion of the International Preliminary Examining Authority for PCT/IB2012/054713, mailed Aug. 29, 2013; IPEA/EP.

\* cited by examiner

METHOD AND SYSTEM FOR ENHANCING IMAGE QUALITY

CROSS-REFERENCE TO RELATED APPLICATIONS

This application is a 371 U.S. National Stage of International Application No. PCT/IB2012/054713, filed Sep. 11, 2012, and claims priority to Indian Patent Application No. 2830/CHE/2011, filed Sep. 18, 2011, and Indian Patent Application No. 3740/CHE/2012, filed Sep. 10, 2012, the disclosures of which are herein incorporated by reference in their entirety.

TECHNICAL FIELD

The present disclosure relates to field of image processing. In particular, the present invention relates to image filtering techniques for enhancing image quality.

BACKGROUND

Developments in image processing have made possible the processing of images in a variety of forms. A variety of filtering methods are available to improve the quality of images including brightness, contrast, non-blurring of edges in the images etc. Conventional available filters reduce impulse-type noise in an image. However, the removal of noise adversely affects edges or corners which exist in an image. The existing techniques while alleviating the noise excessively in the acquired image introduces a severe blurring effect in the discontinuity or edge portions. Also, the noise smoothening is insufficient because the images are low light conditioned images.

Few images are low light conditioned or low contrast type images. An example of such image is a retinal image obtained from a retinal camera. The imaging is plagued by poor visibility conditions due translucent nature of the several tissues exist in the anatomical structure of the retina in the human eye. This amounts to the problem of spatially varying reduction of contrast due to stray radiations, which are scattered by the tissue material. Additionally, the acquisition of image would suffer from impulsive type of noise, which is caused by malfunctioning pixels in camera sensors.

FIG. 1 illustrates an image acquired from a camera that is corrupted by impulsive noise due to camera sensor and low contrast. Conventional image filtering techniques apply noise smoothing filters with filter co-efficient either fixed or determined by some varying co-efficient that is governed by some error evaluation rule between updated output and desired output.

FIG. 2 illustrates the resultant image obtained by employing conventional noise smoothening processes. The conventional process enhances the image but at the same time, smoothens the edges and fails in enhancing the specially reduced contrast in the image due to scattered light. Thus the conventional process yields low contrast image. For purpose of understanding, a portion of image 202 has been highlighted in FIG. 2. In the highlighted portion 202, the image has become blur, and the lines are fainted due to smoothing of image. The highlighted portion 202 is just an exemplary embodiment, however the same effect can be seen over the entire image.

Therefore, the present disclosure overcomes the above-mentioned problems by providing system and methods for tackling both the impulsive noise occur in the retina image due to malfunction of camera sensor and image contrast enhancement that suffered due to low light visibility conditions

SUMMARY OF THE DISCLOSURE

The shortcomings of the prior art are overcome and additional advantages are provided through the provision of a method and a system as described in the description.

The present disclosure provides methods and apparatus to reduce impulsive noise and also correct the image against the attenuation due to air light condition by estimation of the required parameters using special type of filters.

The present disclosure involves applying widow size adapted weighted median filtering and guided image filtering in sequel to arrive at edge preserved retina image.

Accordingly, the present disclosure relates to a method for enhancing image quality. The method comprises obtaining an image and performing adaptive weighted median filtering operation on the obtained image to produce an intermediary image by removing impulse noise. Further, a guided image filtering operation is performed on the intermediary image to enhance contrast and preserve edges of the image.

Accordingly, the present disclosure relates to a system for image quality enhancement. The system comprises a median filtering module configured to perform adaptive weighted median filtering operation on the image to produce an intermediary image by removing impulse noise. Further, the system comprises a guided image filtering module configured to filter the intermediary image to enhance the contrast and preserve the edges of the image.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The features of the present disclosure are set forth with particularity in the appended claims. The disclosure itself, together with further features and attended advantages, will become apparent from consideration of the following detailed description, taken in conjunction with the accompanying drawings. One or more embodiments of the present disclosure are now described, by way of example only, with reference to the accompanied drawings wherein like reference numerals represent like elements and in which:

Figure 1:
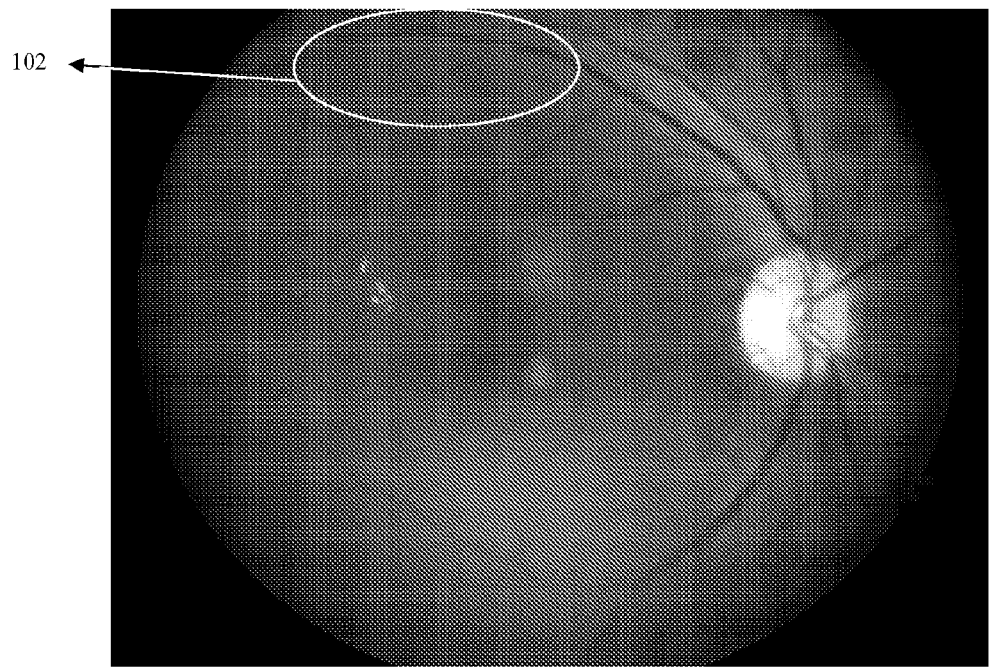
FIG. 1 illustrates an acquired image corrupted by impulsive noise.
Figure 2:
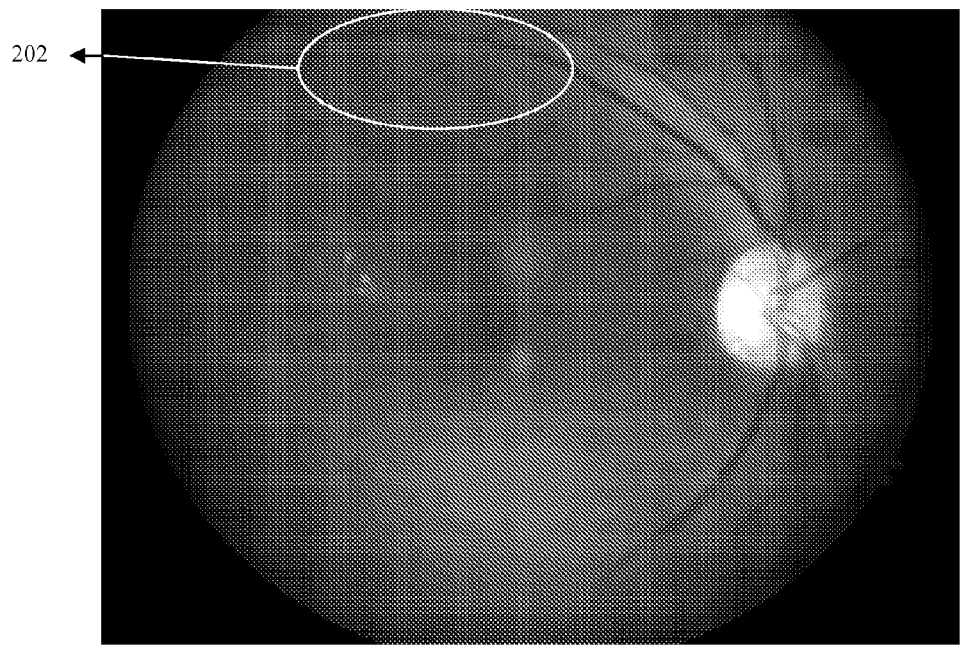
FIG. 2 illustrates an enhanced image output by conventional filtering techniques.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures.

It is to be expressly understood, however, that each of the figures is provided for the purpose of illustration and description only and is not intended as a definition of the limits of the present disclosure.

The present disclosure relates to field of image processing. In particular, the present invention relates to image filtering techniques for enhancing image quality.

Accordingly, the present disclosure relates to a method for enhancing image quality. The method comprises obtaining an image and performing adaptive weighted median filtering operation on the obtained image to produce an intermediary image by removing impulse noise. Further, a guided image filtering operation is performed on the intermediary image to enhance contrast and preserve edges of the image.

In one embodiment of the present disclosure, the adaptive weighted median filtering operation and guided image filtering operation derive filter coefficients from the obtained image.

In another embodiment of the present disclosure, the adaptive weighted median filtering operation derives filter coefficients from the obtained image and the guided image filtering operation derives filter coefficients from the intermediary image.

In yet another embodiment of the present disclosure, the adaptive weighted median filtering operation comprises selecting a pixel of the obtained image and forming a window using all adjacent pixels around the selected pixel. Then, a pixel with maximum value and a pixel with minimum value in the window is determined. Further, value of the selected pixel is compared with the minimum pixel value and the maximum pixel value. Upon comparing, size of the window is increased by including all pixels adjacent to the window until the selected pixel value is determined to be within the minimum and the maximum pixel value. Alternatively, if upon comparison, the selected pixel value is determined to be within the minimum and the maximum pixel value, replacing the selected pixel value with a median of all the pixels values within said window.

In still another embodiment of the present disclosure, the filter coefficient is calculated by using an offset value.

In yet another embodiment of the present disclosure, the offset value is set as one of maximum pixel value of a selected window and median value of pixels of the selected window, upon determining mean removed guiding image pixel value to be positive. Alternatively, the offset value is set as one of minimum pixel value of the selected window, median value of pixels of the selected window and zero, upon determining the mean removed guiding image pixel value to be negative. Further, the offset value is set as zero, upon determining the mean removed guiding image pixel value to be zero.

In still another embodiment of the present disclosure, size of the selected window is fixed.

In another embodiment of the present disclosure, size of the selected window is determined for each pixel value by comparing the difference between variances of two consecutive odd size windows with a threshold value. Upon determining the difference to be less than the threshold value, selecting the selected window size as larger window size of the two consecutive odd size windows. Upon determining the difference to be greater than or equal to the threshold value, increasing size of the two consecutive odd size of windows by two and performing the above steps.

In yet another embodiment of the present disclosure, the size of window is initially set as 3×3.

Accordingly, the present disclosure relates to a system for image quality enhancement. The system comprises a median filtering module configured to perform adaptive weighted median filtering operation on the image to produce an intermediary image by removing impulse noise. The system comprises an adaptive data selection module configured to generate filter coefficients. Further, the system comprises a guided image filtering module configured to filter the intermediary image to enhance the contrast and preserve the edges of the image.

Figure 3:
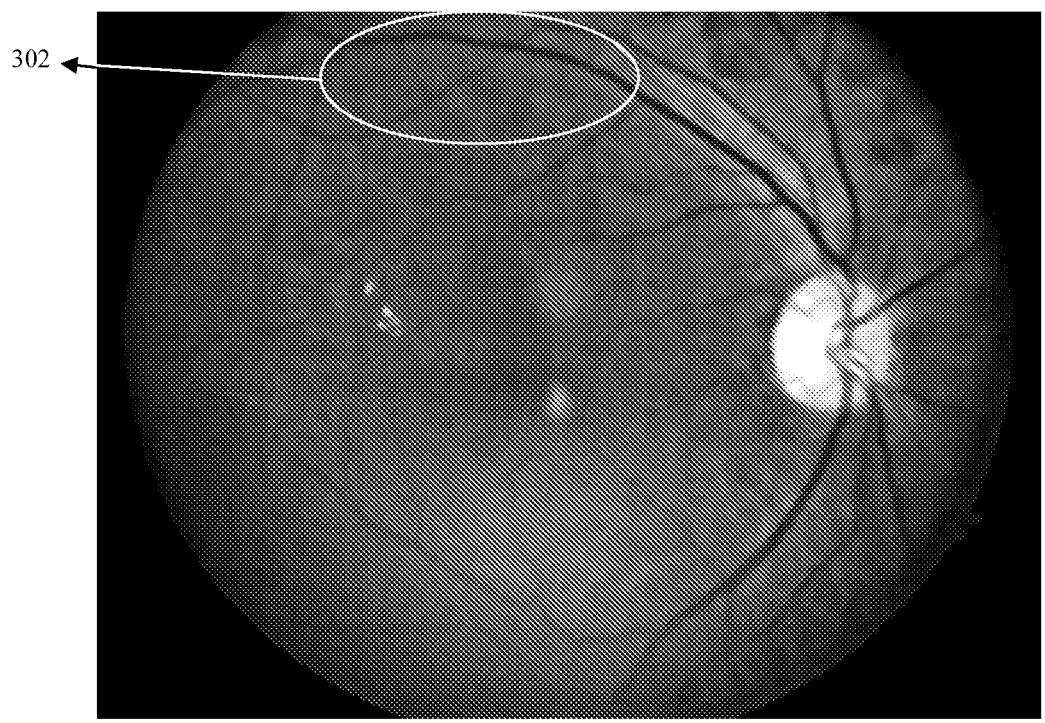
FIG. 3 illustrates an enhanced image output by filtering techniques in accordance with an embodiment of the present disclosure.

FIG. 3 illustrates an enhanced image output by filtering techniques in accordance with an embodiment of the present disclosure. The filtering technique of the present disclosure removes impulsive noise from the image and then performs an enhancement of the low light impulsive noise removed imaged with preservation of edges. In FIG. 3, a portion of the image 302 has been highlighted for the purpose of understanding. The filtering technique of present invention preserves edges while removing noise. Therefore, the portion 302 shows the lines without any distortion and smoothing. The portion of the image 302 is highlighted as an exemplary embodiment and the same effect can be seen through the image of FIG. 3.

Figure 4:
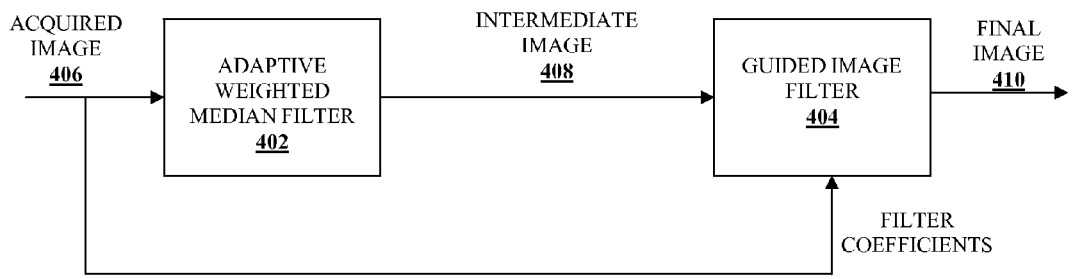
FIG. 4 illustrates a block diagram of the filtering technique in accordance with an embodiment of the present disclosure.

FIG. 4 illustrates a block diagram of the filtering technique in accordance with an embodiment of the present disclosure. In an embodiment, the filtering technique comprises an adaptive weighted median filter 402 and a guided image filter 404. Initially, an input image is provided to the adaptive weighted median filter 402. In an embodiment, the acquired image 406 is taken as the input image. The input image used in embodiments of the present include, but are not limiting to, typical intensity images, low light images, and natural light images of gray or colour image. The filter coefficients for the adaptive weighted median filter 402 are derived from the acquired image 406 itself. By inputting the acquired image 406 as input image, prior information is obtained about the position of discontinuities or edges. Further, by using the acquired image 406, we obtain other conditions required for filtering such as mean, variance and other parameters.

The adaptive weighted median filter 402 processes the inputted acquired image 406 and outputs an intermediate image 408. The intermediate image 408 is a smoothened image from which impulsive noise has been removed. In order to bring back the edges and discontinuities, the intermediate image 408 is input to the guided image filter 404. Simultaneously, the acquired image 406 is also input to the guided image filter 404. The guided image filter 404 derives filter coefficients from the acquired image 406 and processes the intermediate image 408 to output a final image 410. The final image 410 has enhanced contrast and also the edges of the image are preserved.

Figure 5:
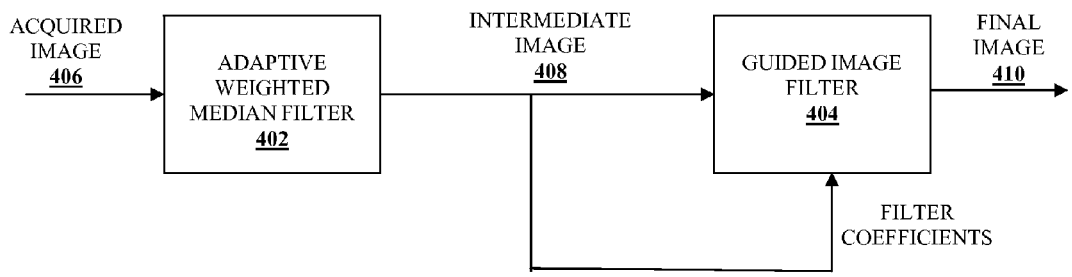
FIG. 5 illustrates a block diagram of the filtering technique in accordance with another embodiment of the present disclosure.

FIG. 5 illustrates a block diagram of the filtering technique in accordance with one embodiment of the present disclosure. According to this embodiment of the present disclosure, an image is input to the adaptive weighted median filter 402. In an embodiment, the acquired image 406 is taken as input image. The filter coefficients for the adaptive weighted median filter 402 are derived from the acquired image 406 itself. The adaptive weighted median filter 402 processes the acquired image 406 and outputs an intermediate image 408. This intermediate image 408 is then provided as input to the guided image filter 404. The filter coefficients required for filtering the image by the guided image filter 404 are also derived from the intermediate image 408. The intermediate image is then processed to output a final image 410. The contrast of the final image 410 is enhanced and the edges of the image are preserved.

Figure 6:
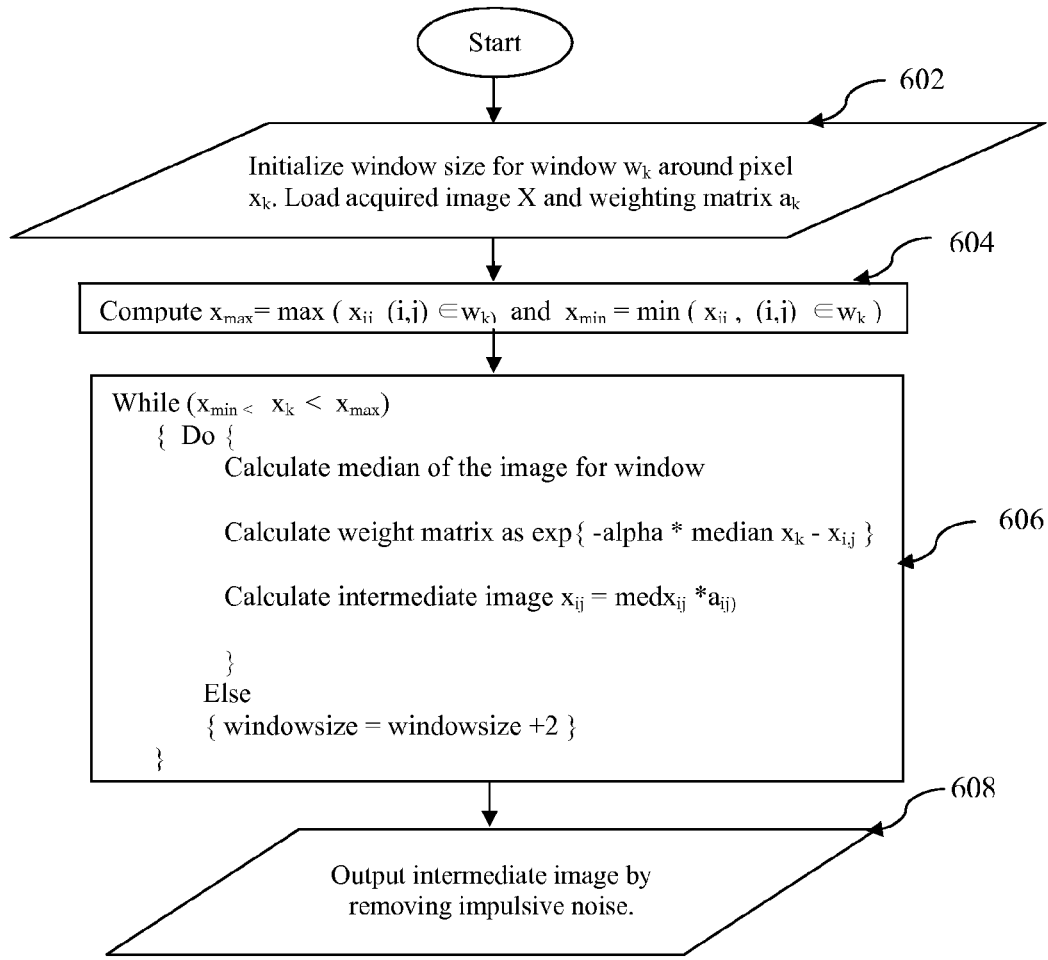
FIG. 6 illustrates a flowchart for implementing weighted median filtering in accordance with an embodiment of the present disclosure.

FIG. 6 illustrates a flowchart for implementing weighted median filtering in accordance with an embodiment of the present disclosure.

The adaptive weighted median filtering involves two implicit processes, wherein it selects the window size adaptively based on specific condition and also performs a weighted median filtering as described below.

An image is characterised as each pixel is correlated to its neighbouring pixels with either high or low correlation. This characteristic is fundamental to decide the degree of smoothness in the region or classify the various regions of the image. If the correlation is low, then it amounts to indicate as sharp discontinuity in the region or boundary of a region like edges or corners or regions are separated by two distinctive levels of contrast regions. On the other hand, if correlation is high, then it amounts to indicate the region is smooth. This indicator serves as a primary attributes in any image analysis algorithm. In order to exploit these characteristics, a local window of pixels is considered around a specified pixel with certain size. The size of the window determines the localness the dependency or correlation that exists between neighbourhood pixels.

Figure 7:
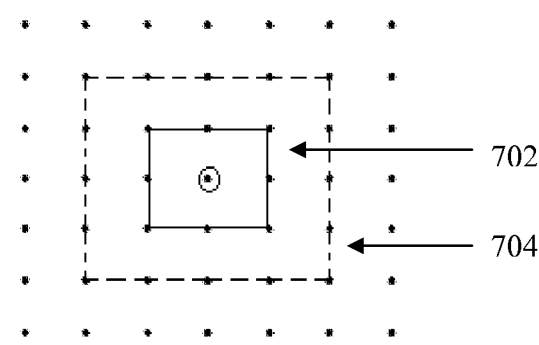
FIG. 7 illustrates the selection of a window around a pixel of an image in accordance with an embodiment of the present disclosure.

FIG. 7 illustrates the selection of a window around a pixel of an image in accordance with an embodiment of the present disclosure. In an exemplary illustration, FIG. 7 shows, for a pixel in the image which is rounded off, neighborhood pixels with in a window of 3×3 (minimum odd sized window) 702 are selected. Then, pixels having a maximum and a minimum value in said window are identified. If the value of center pixel in the window is strictly within this maximum and minimum value of the identified pixels, the weighted median filtering is performed. On the other hand, if the value of center pixel is either equal to minimum or maximum value of the identified pixels, then the window size is increase to next odd value, i.e., window of 5×5 shown as 704 in the figure and the condition is check again till the center pixel value is within the maximum and the minimum value in the selected window.

Once the selected pixel is strictly within the minimum and the maximum value for the compute median med $x_k$ and weight $a_k$ Then, an intermediate image pixel is computed.

Repeat the above process throughout the image by sliding center image to next pixel in raster scan manner using original image. The output obtained by adaptive median filtering is intermediate image which is alleviated by impulsive type of noise.

The adaptive weighted median filtering performs the following operations.

First, all the variables are initialized at step 602. Initialization comprises setting a value for window $w_k$ formed around a selected pixel $x_k$, where size of the window is defined by wsize=|$w_k$|. The window is formed using all adjacent pixels around the selected pixel. Further, a weighting matrix $a_k$ is calculated as hsize*vsize, where hsize and vsize are horizontal and vertical size of the input image. Then an acquired image (any low contrast image) is taken as input image and the image is represented as $x_{i,j}$, where i=0 to (vsize−1), j=0 to (hsize−1). Further, an image scaling parameter alpha is initialized. The value of alpha can be between 1 and 3. In one embodiment, the value of alpha is taken as 1.

After initialization, at step 606, a pixel with maximum value and a pixel with minimum value are determined. At step 608, the value of the selected pixel is compared with minimum and maximum value pixel within the window.

Upon comparison, if the value of selected pixel is not within the minimum and the maximum value pixel within the window, the size of window is increased by including all pixels adjacent to the window. This step is performed until the value of selected pixel is within the minimum and the maximum value pixel, Once the value of selected pixel is within the minimum and the maximum value pixel, the following steps are performed.

A median of the input image is calculated. Median need to be computed in each window only but each window is made to slide over all the pixels in image in a raster scan manner.

The median of image is represented as med $x_k$. Once the median is calculated, weighting of the median value is calculated to obtain weighted median value $a_k$ as exp{−alpha*median $x_k$−$x_{i,j}$}, where alpha is image parameter selected on the basis context whether it is low light image or other type of image and $x_{i,j}$ is center pixel value of the window in the given image. Then, finally an intermediate image is calculated using the weighted median value of the image as med$x_k$*$a_k$. The intermediate image is smoothened image free of impulsive noise.

Figure 8:
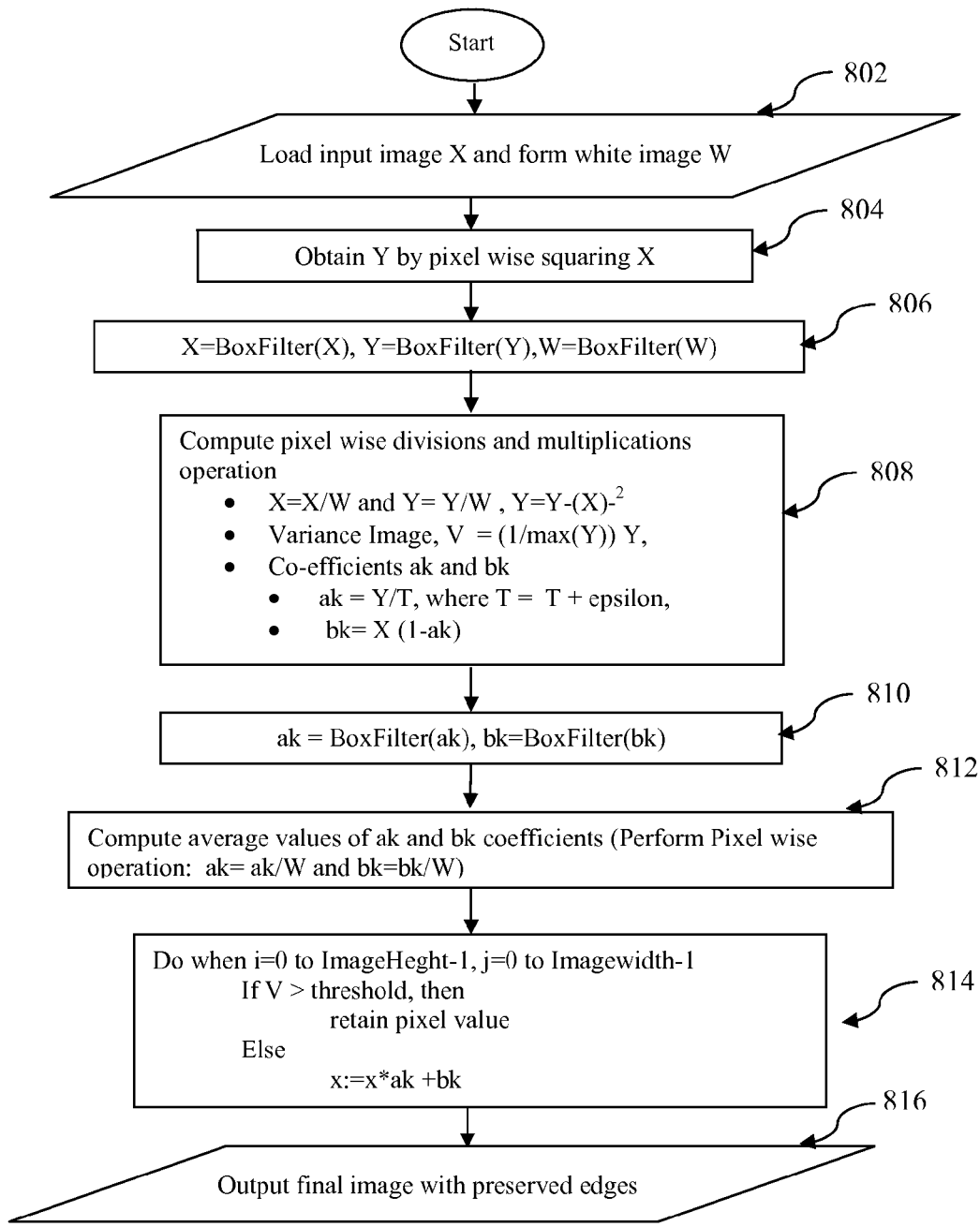
FIG. 8 illustrates a flowchart for implementing guided image filtering in accordance with an embodiment of the present disclosure.

FIG. 8 illustrates a flowchart for implementing guided image filtering in accordance with an embodiment of the present disclosure.

The guided image filtering process is an image filtering technique which takes two inputs, an input image that needs to be enhanced and filter coefficients for processing the image. In one embodiment, the filter coefficients are not fixed and are determined using a guiding image. In the present invention, the guiding image can either be the input image itself or the intermediate image obtained after an adaptive windowed median filtering enhancement process.

The general guided image filter comprises of following processes:

The input image is accessed in a raster scan manner and the following operation is performed at each pixel location in a raster scan manner:

Step 1: Filter coefficients $a_k$ and $b_k$ are computed by selecting a neighborhood window size w such that its center coincides with a considered pixel position. Then the required filter coefficient is computed using pixel encompasses this window using the following expression:

$$a_k = \frac{\frac{1}{|win|}\sum_{i \in win} I_i p_i - \mu \bar{p}}{\sigma^2 + \varepsilon}$$

$$b_k = \bar{p} - a_k \mu$$

wherein, win & |win| are window size and number of pixels inside the window win, $I_i$ is intensity value at position and may consist of color components rgb also σ is variance value of pixels inside window, $p_i$ is intermediate image intensity value at position i, $\bar{p}$ is arithmetic mean of all intermediate image p inside window win, ε is image parameter, and μ is mean value inside window Step 2: A constant variance threshold is pre-selected based on the context of input image (It is intermediate image obtained after an adaptive windowed median filtering) and compared with the actual variance inside window. If the variance inside window is greater than the variance threshold, then the center pixel of the window is retained as it is. Otherwise, the pixel value is multiplied with averaged ak value and added with coefficient bk value for that particular pixel.

The method in FIG. 8 follows a pixel-wise operation, which is efficient and also follows different implementation structures that brings pipeline parallelization structure. This helps in avoiding the performance of method sequentially in raster scan manner.

The guided image filtering technique of the present invention is described as follows:

The first step in guided image filtering operation is initialization at step 802. Firstly, plurality of parameters is initialized. The parameters includes regularization parameter, epsilon (typical epsilon=0.1), image breadth, image width and a predefined threshold. In one embodiment, the predefined threshold is 0.0003=0.1*0.003. Then, the intermediate image, which is the image obtained from adaptive weighted median filter is input to the guided image filter. In one embodiment, the acquired image is also input along with intermediate image. After initialization, a white image W is formed of the same size as the input image.

At step 804, an image Y is formed by pixel wise squaring the input image. At step 806, a box filter is applied on W, Y and the input image separately.

At step 808, the above box filtered input image is scaled and pixel-wise squaring is done on the image Y with the corresponding pixels in the image W.

Then, a variance V is computed as normalized image. After that, filter coefficients $a_k$ and $b_k$ are computed using the acquired image or the intermediary image. These filter coefficients are computed for filtering the image. The computation of V, $a_k$ and $b_k$ is done pixel wise.

At step 810, a box filter is applied to obtain $a_k$=Boxfilter $(a_k)$ and $b_k$=Boxfilter $(b_k)$. Further, at step 812, average values of $a_k$ and $b_k$ are computed by performing pixel-wise operation.

At step 814, if V is greater than the predefined threshold, then the pixel values are not altered. Otherwise, if V is less than the predefined threshold pixel, an enhanced image is computed as follows:

$$x_{i,j} = x_{i,j}\overline{a_k} + \overline{b_k}$$

where $\overline{a_k}$ and $\overline{b_k}$ are average values of $a_k$ and $b_k$ respectively computed at step 812. The enhanced image retains the discontinuities and edges in the image.

In an exemplary embodiment, a selected portion of the image can be enhanced with only guided image filtering and remaining portions of the image can be enhanced with the adaptive weighted median filtering followed by the guided image filtering.

The adaptive weighted median filter removes impulsive or camera sensor noise and the guided image filter retains the discontinuities or edges of the images.

Figure 9:
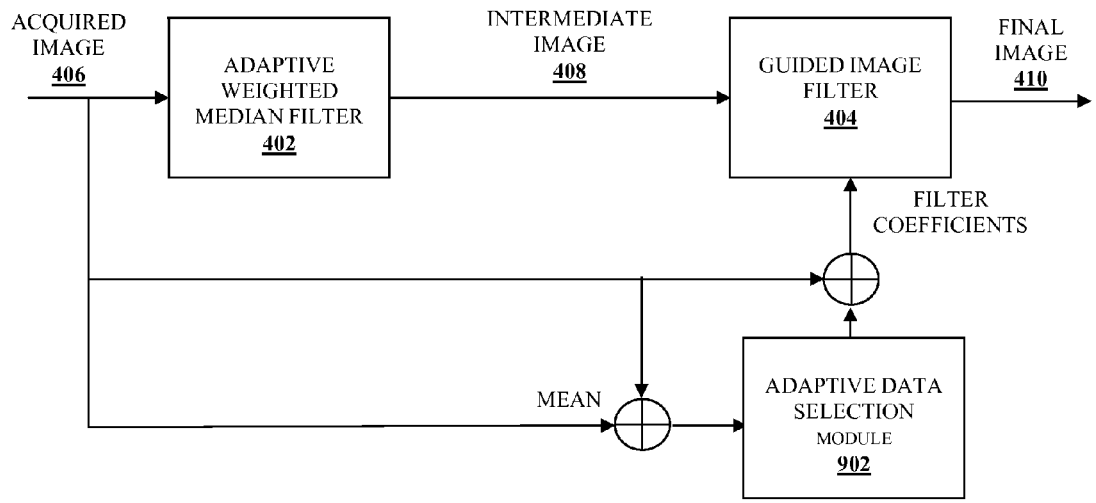
FIG. 9 illustrates a block diagram of adaptive guided image filtering technique in accordance with another embodiment of the present disclosure.

FIG. 9 illustrates a block diagram of adaptive guided image filtering technique in accordance with one embodiment of the present disclosure.

In an embodiment, the filtering technique comprises an adaptive weighted median filter 402, an adaptive guided image filter 404 and an adaptive data selection module 902. In the illustrated embodiment, the filter coefficients provided to the guided image filter 404 are varied based on the various conditions set in the adaptive data selection module 902. Initially, an image is input to the adaptive weighted median filter 402. The adaptive weighted median filter 402 processes the inputted acquired image 406 and outputs an intermediate image 408. The intermediate image 408 is a smoothened image from which impulsive noise has been removed. In order to bring back the edges and discontinuities, the intermediate image 408 is input to the guided image filter 404. Simultaneously, the acquired image 406 is also input to the guided image filter 404. The guided image filter 404 derives filter coefficients from the acquired image 406 and the adaptive data selection module 902, and then processes the intermediate image 408 to output a final image 410.

Figure 10:
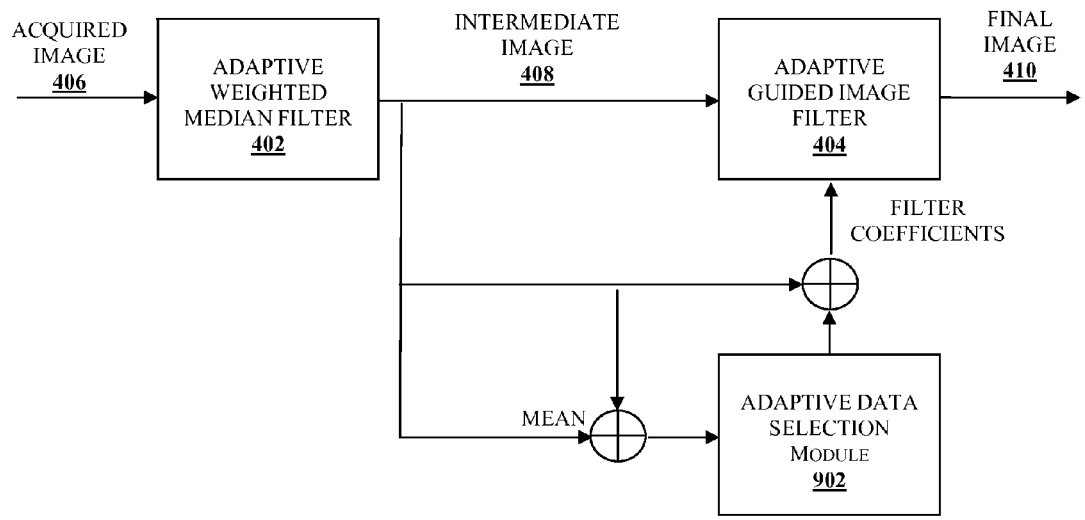
FIG. 10 illustrates a block diagram of adaptive guided image filtering technique in accordance with another embodiment of the present disclosure.

Similarly, FIG. 10 illustrates a block diagram of adaptive guided image filtering technique in accordance with one embodiment of the present disclosure. In the illustrated embodiment, the filtering technique comprises an adaptive weighted median filter 402, an adaptive guided image filter 404 and an adaptive data selection module 902. According to this embodiment of the present disclosure, an image is input to the adaptive weighted median filter 402. In an embodiment, the acquired image 406 is taken as input image. The adaptive weighted median filter 402 processes the acquired image 406 and outputs an intermediate image 408. This intermediate image 408 is then provided as input to the guided image filter 404. The filter coefficients required for filtering the image by the guided image filter 404 are also derived from the intermediate image 408. The filter coefficients provided to the guided image filter 404 are varied based on the various conditions set in adaptive data selection module 902. The intermediate image is then processed to output a final image 410. The contrast of the final image 410 is enhanced and the edges of the image are preserved.

In an embodiment, the edge preserving image enhancement technique is enhanced by two processes performed by the adaptive data selection module 902, namely data adaptive guided image filtering process and window size adaptive guided image filtering process.

The data adaptive guided image filtering process performed by adaptive data selection module 902 is formulated by introducing an offset value to the guiding image that is used as filter coefficient on basis of mean computation in the selected window. The required filter co-efficient $a_k$ is computed in adaptive manner with an introduction of offset value $\xi$ as mentioned below:

$$a_k = \frac{\frac{1}{win}\sum_{i \in win}^{n}(I_i - \xi_i)p_i - \mu\overline{p}}{\sigma^2 - \varepsilon}$$

Where $\xi$ is offset is determined in the following different strategies.

$I_i$=guiding image at $i^{th}$ pixel value
win=selected window $$\xi = \begin{cases} \text{Max}(win), & \Delta I > 0 \\ \text{Min}(win), & \Delta I < 0 \\ 0, & \Delta I = 0 \end{cases} \quad \text{Strategy 1}$$

where $\Delta I=(I_i-\mu)$, mean removed guiding image pixel value $$\xi = \begin{cases} \text{Max}(win), & \Delta I > 0 \\ \text{Median}(win), & \Delta I < 0 \\ 0, & \Delta I = 0 \end{cases} \quad \text{Strategy 2}$$

where $\Delta I=(I_i-\mu)$, mean removed guiding image pixel value $$\xi = \begin{cases} \text{Median}(win), & \Delta I > 0 \\ 0, & \Delta I \leq 0 \end{cases} \quad \text{Strategy 3}$$

where $\Delta I=(I_i-\mu)$, mean removed guiding image pixel value,
max (win)=maximum pixel value of selected window (win)
min(win)=minimum pixel value of selected window (win)
median(win)=median pixel value of selected window (win)

In an alternate embodiment of the present disclosure, the offset value can be taken as zero. In this embodiment, the system of FIG. 9 will function as system of FIG. 4. And, system of FIG. 10 will function as system of FIG. 5.

In one embodiment of the present invention, the size of the selected window (win) can be predetermined and fixed.

In another embodiment of the present invention, the size of the selected window (win) can be varied based on each pixel location and image characteristics. For adaptive window size, an adaptive window size selection is performed by the adaptive data selection module 902. The window selection is performed by an adaptive procedure that exploits the local window variance such that the noise and smooth portion of the images are accounted.

In the embodiment, instead of choosing fixed window win while computing filter coefficients $a_k$ and $b_k$, an adaptive procedure is used to select optimal size window win, out of several sizes of windows. In an exemplary embodiment, the windows is denoted by $win_i$, where the size of window starts from 3×3. i.e. i=3, 5, . . . , etc. The window size is denoted by ixi with local window variance of $win_i$ denoted by $\sigma^i$, respectively.

The following steps are performed in adaptive way at each pixel location to arrive at an optimal window size $win_o$ 1. Initially, select a window $win_3$ with a size 3×3 and compute local window variance $\sigma_3$ by considering the pixels inside $win_3$, where i=3 and set $\sigma$=0 and set Threshold.
2. Perform the following steps to select optimal window size win, as $win_i$ until ($\Delta\sigma$<Threshold),
   i) Do i:=i+2,
   ii) Compute local window variance $\sigma_i$ by considering pixel inside the local window $win_i$.
   iii) Compute $\Delta\sigma=(\sigma_{i+1}^2-\sigma_i^2)$.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and devices within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for enhancing image quality using an image processing system, said method comprising acts of:
    obtaining an image;
    performing, by a median filtering module, an adaptive weighted median filtering operation on each pixel of the obtained image to output an intermediary image by removing impulse noise, wherein performing the adaptive weighted median filtering operation comprises:
        selecting a pixel value of the obtained image;
        forming a window using all adjacent pixels around the selected pixel value;
        determining a pixel with maximum value and a pixel with minimum value in the window;
        comparing value of the selected pixel with the minimum pixel value and the maximum pixel value;
        increasing size of the window by including all pixels adjacent to the window until the selected pixel value is determined to be within minimum and maximum pixel value of the window; and
        upon determining the selected pixel value to be within the minimum and the maximum pixel value, performing:
            determining a median of the window of the obtained image;
            determining weight of the median to obtain weighted median value; and
            determining an intermediate image using the obtained weighted median value; and
    performing, by a guided image filtering module, a guided image filtering operation on the intermediary image to output a final image with enhanced contrast and preserved edges of the image.

2. The method as claimed in claim 1, wherein the adaptive weighted median filtering module and the guided image filtering module derive filter coefficients from the obtained image.

3. The method as claimed in claim 1, wherein the adaptive weighted median filtering module derives filter coefficients from the obtained image and the guided image filtering module derives filter coefficients from the intermediary image.

4. The method as claimed in claim 2, wherein the filter coefficients are calculated by using an offset value.

5. The method as claimed in claim 4, wherein
the offset value is set as one of maximum pixel value of a selected window and median value of pixels of the selected window, upon determining mean removed guiding image pixel value to be positive;
the offset value is set as one of minimum pixel value of the selected window, median value of pixels of the selected window and zero, upon determining the mean removed guiding image pixel value to be negative;
the offset value is set as zero, upon determining the mean removed guiding image pixel value to be zero, wherein the mean removed guiding image pixel is difference between guiding image at a pixel value inside a selected window and mean pixel value inside the selected window.

6. The method as claimed in claim 5, wherein size of the selected window is fixed.

7. The method as claimed in claim 5, wherein size of the selected window is determined for each pixel value by steps comprising:
   a. comparing the difference between variances of two consecutive odd size windows with a threshold value;
   b. selecting the selected window size as larger window size of the two consecutive odd size windows upon determining the difference to be less than the threshold value; and
   c. increasing size of the two consecutive odd size of windows by two and performing the steps a and b upon determining the difference to be greater than or equal to the threshold value.

8. The method as claimed in claim 7, wherein the size of window is initially set as 3×3.

9. The method as claimed in claim 3, wherein the filter coefficients are calculated by using an offset value.

10. A system for image quality enhancement comprising:
a median filtering module configured to perform adaptive weighted median filtering operation on each pixel of the image to output an intermediary image by removing impulse noise, said median filtering module is configured to:
select a pixel value of the obtained image;
form a window using all adjacent pixels around the selected pixel value;
determine a pixel with maximum value and a pixel with minimum value in the window;
compare value of the selected pixel with the minimum pixel value and the maximum pixel value;
increase size of the window by including all pixels adjacent to the window until the selected pixel value is determined to be within minimum and maximum pixel value of the window; and
upon determining the selected pixel value to be within the minimum and the maximum pixel value,
   determine a median of the window of the obtained image;
   determine weight of the median to obtain weighted median value; and
   determine an intermediate image using the obtained weighted median value
an adaptive data selection module configured to generate filter coefficients; and
a guided image filtering module configured to filter the intermediary image using the generated filter coefficient and output a final image with enhanced contrast and preserved edges of the image.

11. The system as claimed in claim 10, wherein the adaptive weighted median filtering module and the guided image filtering module derive the filter coefficients from the obtained image.

12. The system as claimed in claim 10, wherein the adaptive weighted median filtering module derives filter coefficients from the obtained image and the guided image filtering module derives filter coefficients from the intermediary image.

* * * * *